US005438491A

United States Patent [19]
White

[11] Patent Number: 5,438,491
[45] Date of Patent: Aug. 1, 1995

[54] VEHICULAR SUN VISOR ASSEMBLY

[75] Inventor: Jay R. White, Bloomfield Hills, Mich.

[73] Assignee: Jay Roberts Company, Rochester Hills, Mich.

[21] Appl. No.: 155,461

[22] Filed: Nov. 19, 1993

[51] Int. Cl.⁶ ............................................. B60Q 3/00
[52] U.S. Cl. .................... 362/83.1; 362/140; 362/144; 362/295; 362/802
[58] Field of Search ............. 362/83.1, 140, 141, 362/142, 144, 277, 295, 319, 802, 394, 234; 296/97.2, 97.4, 97.5

[56] References Cited

U.S. PATENT DOCUMENTS

| | | | |
|---|---|---|---|
| 4,511,954 | 4/1985 | Marcus et al. | 362/144 X |
| 4,564,234 | 1/1986 | Kaiser et al. | 296/97.5 |
| 4,648,011 | 3/1987 | Boote et al. | 296/97.5 X |
| 4,653,798 | 3/1987 | White et al. | 296/97.5 |
| 4,791,537 | 12/1988 | Fisher et al. | 362/135 |
| 4,809,140 | 2/1989 | Jonsas | 296/97.5 X |
| 4,858,983 | 8/1989 | White et al. | 296/97.13 |
| 4,866,579 | 9/1989 | Miller et al. | 362/144 |
| 4,922,391 | 5/1990 | Dykstra | 362/144 |
| 4,948,240 | 8/1990 | Zipperle | 296/97.5 X |
| 4,953,064 | 8/1990 | Viertel et al. | 362/74 |
| 4,961,608 | 10/1990 | Nash | 296/97.5 |
| 5,054,839 | 10/1991 | White et al. | 296/97.1 |
| 5,061,003 | 10/1991 | Gabas | 296/97.1 |
| 5,143,678 | 9/1992 | Prillard | 296/97.5 X |
| 5,188,446 | 2/1993 | Miller | 362/83.1 |
| 5,205,639 | 4/1993 | White et al. | 362/137 |
| 5,329,430 | 7/1994 | Lanser et al. | 362/83.1 |

Primary Examiner—Stephen F. Husar
Attorney, Agent, or Firm—Gifford, Krass, Groh, Sprinkle, Patmore, Anderson & Citkowski

[57] ABSTRACT

A vehicular sun visor having a lighted vanity-mirror and sliding door is provided with a fixed lens aligned with a lamp at one end of the mirror and a lens which moves with the door into alignment with the lamp at the other end of the mirror. An automatic brightening intensity circuit is provided. Automatic motor drive is also provided for the sliding door.

9 Claims, 2 Drawing Sheets

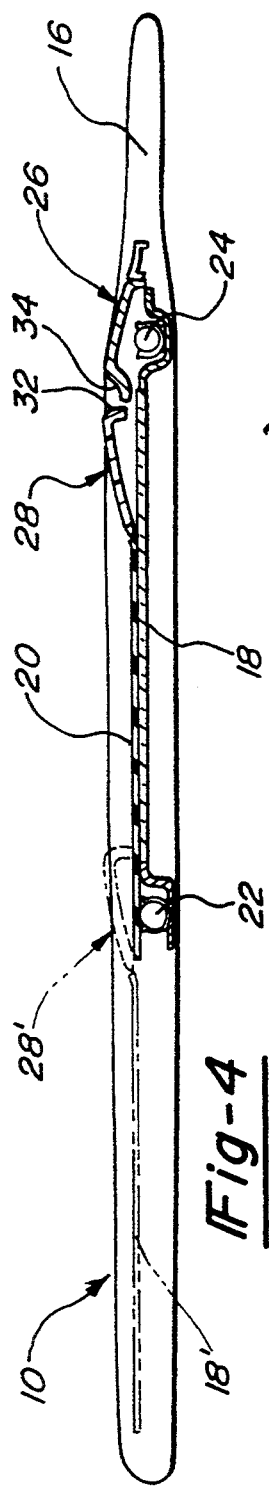
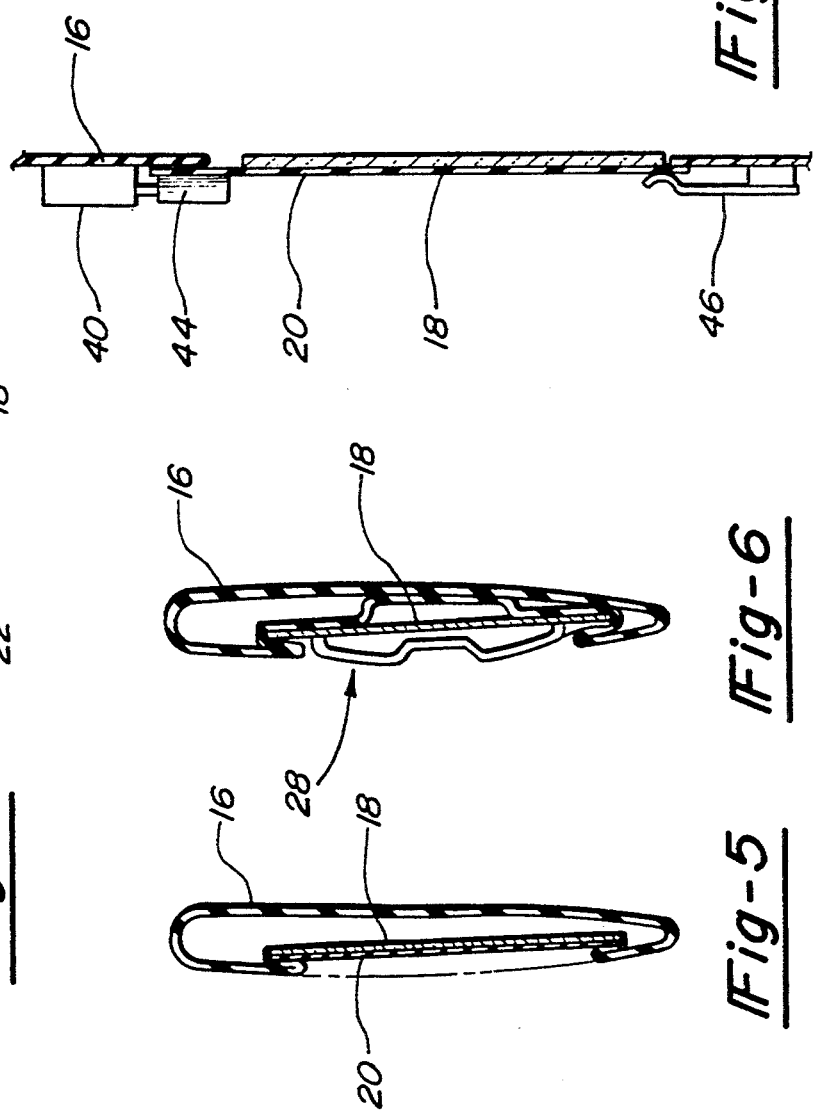

VEHICULAR SUN VISOR ASSEMBLY

BACKGROUND OF THE INVENTION

1. Field of the Invention

This invention relates to a vehicular sun visor, and, more particularly, this invention relates to sun visors having a lighted vanity mirror with a sliding door that may be moved from a closed position covering the mirror to an open position exposing the mirror for use.

2. Description of the Prior Art

There is a wide variety of vehicular sun visors available that provide the driver and passenger not only with basic sun glare protection but also provide the convenience of a vanity mirror which is often lighted. Typically a door or cover is supplied over the mirror which can be moved from a closed position concealing the mirror to an open position exposing the mirror for use. The more popular designs combined the safety of a sliding door with other features which enhance the aesthetic appearance. Examples of these sun visors can be seen in U.S. Pat. Nos. 4,653,798, 4,858,983, 5,054,839 and 5,205,689.

SUMMARY OF THE PRESENT INVENTION

The present invention is directed to further refinements involving mechanical improvements with an emphasis on styling which compels selection by the automotive manufacturer and provides ultimate satisfaction to the purchaser by alluding to luxurious elegance in a clean, vital, sparkling, spirited design providing pizazz to the vehicle.

The present invention provides in a vehicular sun visor assembly which has a vanity mirror, sliding door and lamps on each side of the vanity mirror, the novel combination of a stationary and moving lens in which the stationary lens is mounted to the core aligned with one of the lamps and the moving lens is mounted on the sliding door to be aligned with the other lamp when the sliding door is in its open position. The lighting circuit actuates the lamps for directing light through the lenses towards an object to be observed in the vanity mirror. The lenses are continguous to each other when the sliding door is in a closed position, and a switch actuates the lighting circuit when the sliding door is moved to its open position.

In this type of sun visor with a sliding door, the lighting circuit is provided with means for increasing the light intensity from an unlit condition to full intensity over a period between approximately one half to five seconds and preferably between one half to two seconds after the switch has been actuated to provide a proper ambience and focus to the user. This also eliminates the need for a separate dimming switch as often previously used.

Another feature in this vehicular sun visor assembly having the sliding door is the provision of a motor for automatically sliding the door between its closed and opened position. A motor circuit provides switching for actuating the motor which can be in the form of a concealed push-button switch or in a switching device which is responsive to opening or closing force applied to the sliding door.

BRIEF DESCRIPTION OF THE DRAWINGS

The preferred embodiments of the invention are illustrated in the drawing in which:

FIG. 4 is a longitudinal cross-section of the visor taken along line 4—4 of FIG. 3 showing a preferred form of the two lenses in the position they occupy when the sliding door is in its closed position;

FIG 5 is a transverse cross-sectional view of the visor taken along line 5—5 of FIG. 3;

FIG. 6 is a transverse cross-sectional view of the visor taken along line 6—6 of FIG. 3 showing a preferred profile for one of the lenses; and FIG. 7 is a transverse cross-sectional view taken along line 7—7 of FIG. 3 with parts broken away to show the motor drive for the sliding door.

DETAILED DESCRIPTION OF THE PREFERRED EMBODIMENTS OF THE INVENTION

Figure 1:
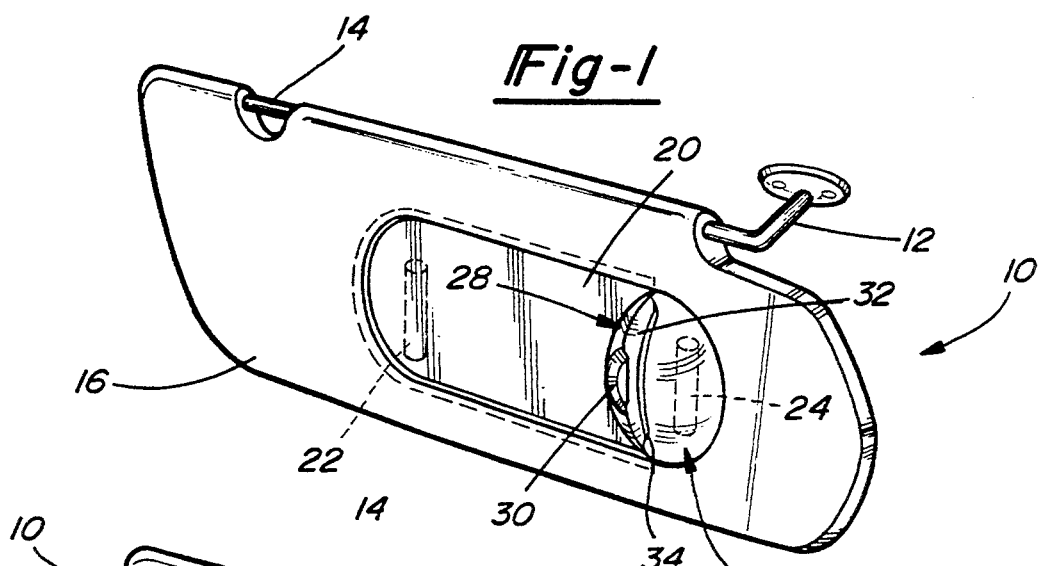
FIG. 1 is a perspective view of the sun visor assembly of this invention with a sliding door in its closed position covering a vanity mirror.
Figure 2:
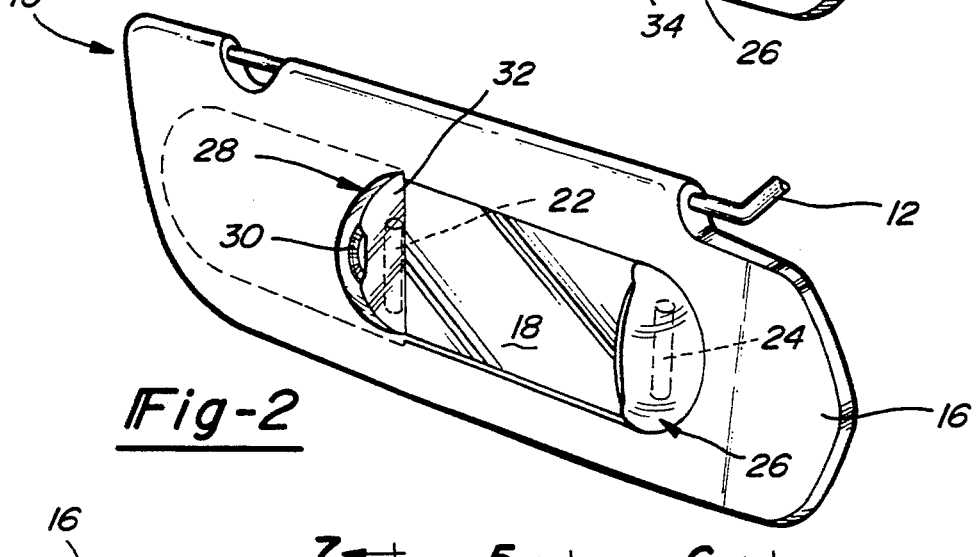
FIG. 2 is a perspective view similar to FIG. 1 showing the sliding door in its open position allowing the lamps to direct light through lenses towards an object to be viewed in the vanity mirror.

Referring to FIGS. 1 and 2, the vehicular sun visor assembly 10 of the invention is shown in a passenger side embodiment with a supporting pivot rod 12 extending from the right side and with the visor in its use position as it would be in front of the vehicle windshield. The driver side embodiment will have its pivot rod extending from the left side of the visor with an inward support rod 14 being adjacent the right side.

The visor core element 16 can take a variety of forms such as a central support board with the vanity mirror 18 and sliding door or cover 20 directly mounted therein or with the central support board being a chip board or molded plastic with the board receiving a frame structure housing the mirror and door as shown in U.S. Pat. No. 4,653,798.

The core element can also be one of the newer, lighter versions having a molded plastic lattice work frame receiving a vanity mirror and sliding door subframe as shown in U.S. Pat. No. 4,858,983 or an integrally molded base core-cover core hinged and snapped together with an outer decorative upholstery material as shown in U.S. Pat. Nos. 5,054,839 and 5,205,639.

In the illustrated preferred embodiment, lamps 22 and 24 are located, one at each end or transverse side of mirror 18, and a first, fixed lens 26 is aligned with one of the lamps 24. Uniquely, a second lens 28 is mounted at one end of sliding door 20 and becomes operative only when the door is slid to its open position aligning lens 28 with the other lamp 22 as shown in FIG. 2. The lens 28 and the door 20 can be integrally molded or be separate items. In any event the door portion will be opaque and the lens portion at the end of the door portion will be transparent.

In all previous lighted vanity mirrors, uneven lighting occurs creating hot and cold spots because the lens is in close proximity, usually in contact, with the lamp. Whereas in the lighting system of the present invention the lens is spaced from the lamp providing bright even dispersion of the light.

Figure 3:
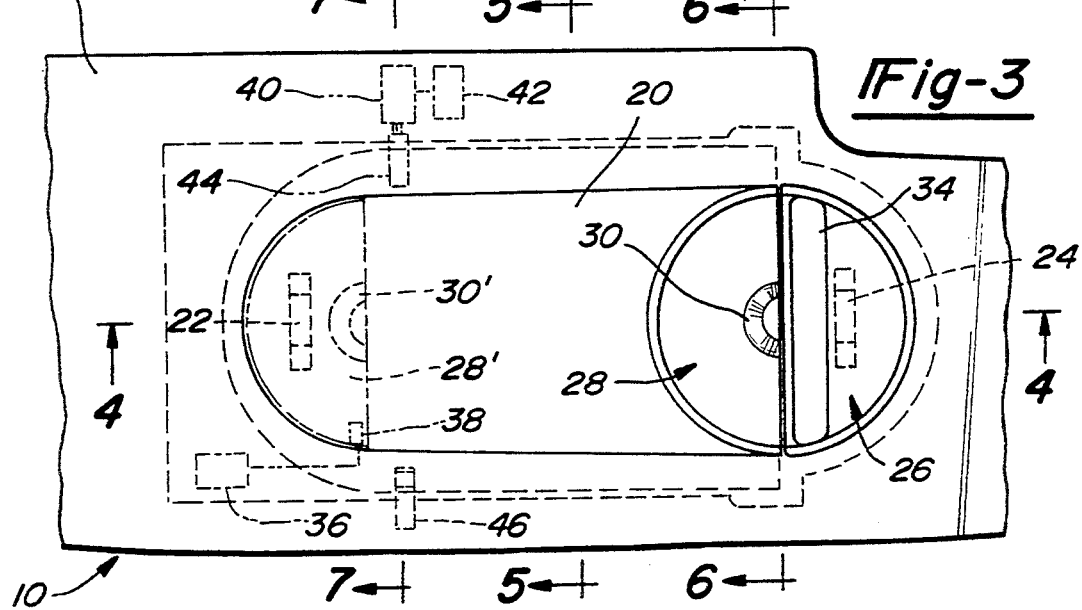
FIG. 3 is a plan view showing an enlargement of the sliding door with a motor operator and the lighting circuit for actuation of the lamps.

Door 20 can be slid open by manually engaging purchase depression 30 in lens 28 as best seen in FIGS. 1 and 2 or by engaging planar surface 32 of lens 28 accessible through groove 34 in lens 26, as best seen in FIGS. 3 and 4. Other means can be used to provide a purchase for moving the sliding door 20.

Another unique innovation of the present invention is the concept of using a lighting circuit 36 with a timed increase in voltage to provide a gradual increase in light intensity from an unlit condition to full intensity when the sliding mirror door 20 is moved into its open position. In this open position the door is concealed within the visor assembly as seen at 20' in FIG. 4. To accomplish this, the lighting circuit 36 can have an electrical resistance-capacitance network initiated by a switch 38 which can be a proximity or limit switch activated when the door is opened. The lens 28 is seen in its door open, operative position at 28' in FIGS. 3 and 4. The lighting circuit is designed to provide a "gradual" light intensity increase time period of between one half and two seconds and preferably about one and one half seconds to give the user full perception of this unusual "light up" feature accommodating the user's eyes to the lighted mirror image.

Still another innovation of the present invention is the provision of a drive for automatically opening and closing the sliding door 20. Referring to FIGS. 3 and 7, a motor 40 is provided controlled by motor circuit 42 to open and close the door. In the illustrated embodiment, the motor drives a roller 44 which drivingly engages the edge of the door. The opposite edge of the door can be held in position by spring clip 46. The motor drive circuit can contain a push button switch, preferably hidden under the visor upholstery material, to energize the drive. This switch can be a reverse polarity push button switch so that it alternatingly energizes the motor to open and close the door. Alternatively, the motor circuit can contain switching means responsive to manual opening and closing pressure applied to the door.

I claim:

1. A vehicular sun visor assembly comprising:
    a longitudinally extending core member;
    a vanity mirror having a longitudinally extending top, a longitudinally extending bottom and generally transverse sides mounted in said core member;
    a sliding door mounted in said core member for movement from a closed position covering said vanity mirror to an open position exposing said vanity mirror for use and concealing said sliding door within said vehicular sun visor assembly;
    a pair of lamps, one located adjacent to each transverse side of said vanity mirror;
    a first lens mounted to said core member aligned with one of said pair of lamps;
    a second lens mounted on said sliding door aligned with the other of said pair of lamps when said sliding door is in its open position; and
    a lighting circuit actuating said pair of lamps for directing light through said first and second lenses toward an object to be observed in said vanity mirror.

2. The vehicular sun visor assembly according to claim 1 wherein said first and second lenses each have a generally transverse side which are contiguous to each other when said sliding door is in said closed position.

3. The vehicular sun visor assembly according to claim 1 including switch means actuating said lighting circuit when said sliding door is moved to its open position.

4. The vehicular sun visor assembly according to claim 3 wherein said lighting circuit has means for increasing light intensity from an unlit condition to full intensity over a period between approximately one half to five seconds after said switch means is actuated.

5. The vehicular sun visor assembly according to claim 4 wherein said lighting circuit has means for increasing light intensity from an unlit to full intensity over a period between approximately one half to two seconds.

6. The vehicular sun visor assembly according to claim 1 including motor means for moving said sliding door between its closed and open positions.

7. The vehicular sun visor assembly according to claim 6 including a motor circuit having switching means for actuating said motor.

8. A vehicular sun visor assembly comprising:
    a longitudinally extending core member;
    a longitudinally extending vanity mirror mounted in said core member;
    a sliding door mounted in said core member for movement from a closed position covering said vanity mirror to an open position exposing said vanity mirror for use and concealing said sliding door within said vehicular sun visor assembly;
    at least one lamp located adjacent to said vanity mirror;
    a lighting circuit actuating said at least one lamp for directing light toward an object to be observed in said vanity mirror; and
    switch means actuating said lighting circuit when said sliding door is moved to its open position;
    said lighting circuit having means for increasing light intensity from an unlit condition to full intensity over a period between approximately one half to two seconds after said switch means is actuated.

9. A vehicular sun visor assembly comprising:
    a longitudinally extending core member;
    a longitudinally extending vanity mirror mounted in said core member;
    a sliding door mounted in said core member for movement from a closed position covering said vanity mirror to an open position exposing said vanity mirror for use and concealing said sliding door within said vehicular sun visor assembly;
    at least one lamp located adjacent to said vanity mirror;
    a lighting circuit actuating said at least one lamp for directing light toward an object to be observed in said vanity mirror;
    switch means actuating said lighting circuit when said sliding door is moved to its open position;
    motor means for moving said sliding door between its closed and open positions; and
    a motor circuit having switching means for actuating said motor.

* * * * *